US011449902B1

(12) United States Patent
Griggs et al.

(10) Patent No.: US 11,449,902 B1
(45) Date of Patent: Sep. 20, 2022

(54) AUTOMATED SUBMISSION FOR SOLICITED APPLICATION SLOTS

(71) Applicant: El Toro.Com, LLC, Louisville, KY (US)

(72) Inventors: Stacy B. Griggs, Shelbyville, KY (US); David T. Stadler, III, Louisville, KY (US); Richard M. Teachout, III, Louisville, KY (US); Benjamin Charles Woolley, Bothell, WA (US)

(73) Assignee: EL TORO.COM, LLC, Louisville, KY (US)

( * ) Notice: Subject to any disclaimer, the term of this patent is extended or adjusted under 35 U.S.C. 154(b) by 65 days.

(21) Appl. No.: 16/564,390

(22) Filed: Sep. 9, 2019

Related U.S. Application Data

(63) Continuation of application No. 15/864,751, filed on Jan. 8, 2018, now Pat. No. 10,423,986, which is a
(Continued)

(51) Int. Cl.
*G06Q 30/00* (2012.01)
*G06Q 30/02* (2012.01)
*G06F 17/18* (2006.01)

(52) U.S. Cl.
CPC ......... *G06Q 30/0275* (2013.01); *G06F 17/18* (2013.01); *G06Q 30/0254* (2013.01);
(Continued)

(58) Field of Classification Search
None
See application file for complete search history.

(56) References Cited

U.S. PATENT DOCUMENTS

| 4,887,818 A | 12/1989 | Escott |
| 7,933,798 B1 | 4/2011 | Yan et al. |

(Continued)

OTHER PUBLICATIONS

Bojinov et al., Mobile Device Identification via Sensor Fingerprinting, Aug. 6, 2014, arXiv.org (Year: 2014).*

(Continued)

*Primary Examiner* — Naresh Vig
(74) *Attorney, Agent, or Firm* — Middleton Reutlinger

(57) ABSTRACT

Systems, methods, and computer-readable media (transitory and non-transitory) are provided herein for automated submission for solicited application slots. In various embodiments, a digital component source process executing on a first computing system may determine a device identifier associated with an application slot to be populated with digital component(s). The application slot may be solicited by a digital component liaison process executing on the first computing system or a second computing system. The digital component source process may retrieve application slot attainment parameter(s) associated with the device identifier. The application slot attainment parameter(s) may be generated based on location ordinal(s) associated with the device identifier. The digital component source process may determine, based on the retrieved application slot attainment parameters, a submission to populate the application slot with a particular digital component item. The digital component source process may provide the submission to the digital component liaison process.

20 Claims, 8 Drawing Sheets

Related U.S. Application Data continuation-in-part of application No. 15/049,532, filed on Feb. 22, 2016, now Pat. No. 11,037,228.

(52) U.S. Cl.
CPC ..... *G06Q 30/0255* (2013.01); *G06Q 30/0261* (2013.01); *G06Q 30/0269* (2013.01); *G06Q 30/0277* (2013.01)

(56) References Cited

U.S. PATENT DOCUMENTS

| | | |
|---|---|---|
| 8,046,294 B2 | 10/2011 | Zhou et al. |
| 8,277,320 B1 | 10/2012 | Hart et al. |
| 8,365,241 B1 | 1/2013 | Gunda |
| 2002/0077953 A1 | 6/2002 | Dutta |
| 2003/0055729 A1 | 3/2003 | Bezos et al. |
| 2004/0267658 A1 | 12/2004 | Sandholm et al. |
| 2007/0083611 A1 | 4/2007 | Farago et al. |
| 2007/0113250 A1 | 5/2007 | Logan et al. |
| 2008/0108371 A1 | 5/2008 | Alizadeh-Shabdiz et al. |
| 2008/0133258 A1 | 6/2008 | Kontogouris |
| 2009/0012868 A1 | 1/2009 | Deangelis |
| 2009/0129377 A1 | 5/2009 | Chambedain et al. |
| 2009/0248522 A1 | 10/2009 | Hu |
| 2009/0325685 A1 | 12/2009 | Webb et al. |
| 2010/0324973 A1 | 12/2010 | D'ambrosio et al. |
| 2011/0246298 A1 | 10/2011 | Williams et al. |
| 2011/0288928 A1 | 11/2011 | Patwa et al. |
| 2012/0036034 A1 | 2/2012 | Golden et al. |
| 2012/0058742 A1 | 3/2012 | Razoumov et al. |
| 2012/0123928 A1 | 5/2012 | Baggott |
| 2013/0268351 A1 | 10/2013 | Abraham et al. |
| 2014/0095324 A1* | 4/2014 | Cabral ............... G06Q 30/0243 705/14.71 |
| 2014/0236725 A1* | 8/2014 | Golden ............... G06Q 30/0267 705/14.58 |
| 2014/0372202 A1* | 12/2014 | Hummel ............ G06Q 30/0242 705/14.41 |
| 2015/0058088 A1 | 2/2015 | Unser et al. |
| 2015/0058138 A1 | 2/2015 | Schler |
| 2015/0154650 A1* | 6/2015 | Umeda .................. G06Q 30/08 705/14.68 |
| 2015/0310502 A1* | 10/2015 | Tang .................. G06Q 30/0275 705/14.71 |
| 2016/0117736 A1* | 4/2016 | Dasdan ................ H04L 67/306 705/14.66 |
| 2017/0161793 A1* | 6/2017 | Knapp .................. G06Q 30/08 |

OTHER PUBLICATIONS

Advertising bidding system and method, Jul. 24, 2006, printed from www.ip.com(https://priorart.ip.com/IPCOM/000138556) (Year: 2006).*

Ockenfels, Axel, and Alvin E. Roth. "Late and multiple bidding in second price internet auctions: Theory and evidence concerning different rules for ending an auction." Games and Economic behavior 55.2 (2006): 297-320. (year: 2006).

Antoniou, Dimitris, et al. "Exposing click-fraud using a bursy detection algorithm." 2011 IEEE Symposium on Computers and Communications (ISCC). IEEE, 2011. 2011.

Vaughan-Nichols, Steven J., Will Mobile Computing's Future be Location, Location, Location?, Industry Trends, IEEE 2009, all pages.

* cited by examiner

AUTOMATED SUBMISSION FOR SOLICITED APPLICATION SLOTS

BACKGROUND

Real time bidding is the process by which online content providers generate and provide submissions (or "bids") for the right to populate what will be referred to herein as "application slots" with one or more digital components. An "application slot" may refer to an opportunity, facilitated by a distributor of digital components, for a third party to make digital components available to a user. A commonly-known example of an application slot is a spatial portion of a website, such as a banner portion, that may be selectively populated with digital components such as a graphical banner. Another example of an application slot is a time interval inserted between songs or videos of an online media streaming service. Various entities may generate and provide submissions for the right to populate application slots with their digital component(s). For example, entities may deploy (e.g., on a "demand side platform," or "DSP") so-called "digital component source processes" that automatically, without routine human intervention, generate and provide submissions for application slots solicited by so-called "digital component liaison processes," in a process that is often referred to as "programmatic buying." In a typical scenario, a digital component source process learns of an available application slot, e.g., from a digital component liaison process, when a user conducts activity such as loading a webpage that includes one or more application slots.

When notified of an available application slot, many digital component source processes may obtain one or more so-called "cookies" (small pieces of data that provide information about a user's online behavior) associated with the user for which the application slot is available. The digital component source processes may then perform various types of analysis using the cookie in order to determine an appropriate submission to populate the application slot with digital component(s). Suppose the cookie indicates the user has recently visited multiple websites relating to outdoor activities. A digital component source process with outdoor-related digital component(s) in its inventory may generate a relatively earnest submission (e.g., a relatively high bid) for that application slot because there is a relatively high likelihood the user will be interested in the digital component(s). A digital component source process with only irrelevant digital component(s) in its inventory may not provide a submission for the application slot at all, or may provide a relatively moderate submission.

Generating submissions to populate application slots based on cookies may have various shortcomings. For example, cookies may be spoofed or copied in order to cause entities to overspend on application slots that are not likely to be effective. Moreover, cookies are ephemeral in nature, and therefore may not be the best indicators for long term behavior of a user. Additionally, analyzing cookies and generating submissions based on the analysis may be relatively complex, and in some cases may require communication between multiple computing systems over one or more networks. It may be relatively difficult to update digital component source process databases to properly reflect winning submissions, click through rates, and so forth, when records are indexed by something that changes and/or expires as frequently as a cookie. And a solicited application slot may be won in a matter of milliseconds. Thus, the inherent latency associated with cookie analysis and calculation may put the digital component process at a competitive disadvantage.

SUMMARY

This specification is directed generally to techniques for automatic determination and provision of submissions to populate solicited application slots with digital component(s). When a user operates a computing device to navigate a software application to an online interface provided by a publisher, the online interface may include one or more application slots. The publisher may solicit the one or more application slots to a digital component liaison process such as a demand side platform ("DSP"). The digital component liaison process may initiate a solicitation routine to solicit submissions to populate the one or more application slots with digital component(s). So-called "digital component source process" may be subject to the solicitation routine, and may determine submissions for the application slots automatically, within a duration of the solicitation routine. To obtain a competitive advantage over traditional similar processes, digital component source processes configured with selected aspects of the present disclosure may be provided with so-called "application slot attainment parameters" that each digital component source process can use to quickly determine submissions to populate the one or more application slots with digital component(s). The application slot attainment parameters may be determined using device and/or network identifiers such as IP addresses and/or location ordinals, in addition to or instead of cookies. Additionally, in some embodiments, the application slot attainment parameters may include so-called "demand slope" data and/or pre-calculated submissions, which a digital component source process may obtain and quickly process, avoiding lengthy calculations on the fly.

In some embodiments, a method may include the following operations: determining, by a digital component source process executing on a first computing system, a device identifier associated with an application slot to be populated with digital component(s), wherein the application slot is solicited by a digital component liaison process executing on the first computing system or a second computing system; retrieving, by the digital component source process, one or more application slot attainment parameters associated with the device identifier, wherein the one or more application slot attainment parameters are generated based at least in part on one or more location ordinals associated with the device identifier; determining, by the digital component source process, based on the retrieved application slot attainment parameters, a submission to populate the application slot with a particular digital component item; and providing, by the digital component source process, the submission to the digital component liaison process.

This method and other implementations of technology disclosed herein may each optionally include one or more of the following features.

In various embodiments, the one or more application slot attainment parameters associated with the device identifier may be retrieved from volatile memory local to the first computing system. In various embodiments, the one or more application slot attainment parameters associated with the device identifier may be generated based on statistical analysis of the one or more location ordinals. In various embodiments, the statistical analysis may include estimating a geographic area that represents a given percentile of the one or more location ordinals.

In various embodiments, the geographic area may be estimated based on a standard deviation calculated based on the one or more location ordinals. In various embodiments, the one or more location ordinals may include a plurality of position coordinates.

In another aspect, a method may include the following operations: obtain one or more location ordinals associated with one or more device identifiers; generate, based on the one or more location ordinals associated with the one or more device identifiers, one or more application slot attainment parameters associated with the one or more device identifiers; and store the one or more application slot attainment parameters in volatile memory that is local to a computing system that operates one or more digital component source processes, wherein the one or more digital component source processes utilize the one or more application slot attainment parameters to respond to solicitations from one or more digital component liaison processes to populate application slots with digital component(s).

Other implementations may include one or more non-transitory computer readable storage media storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
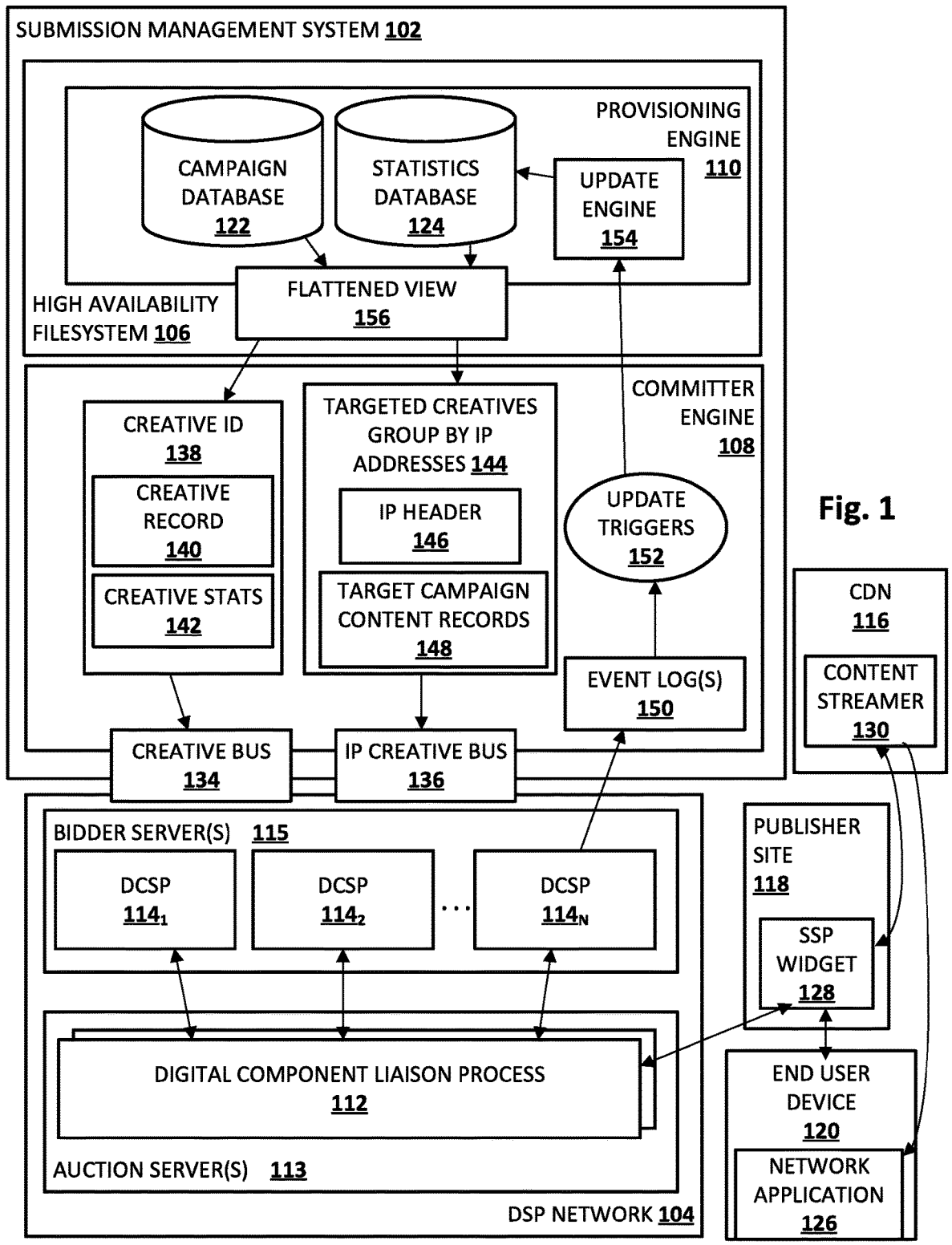
FIG. 1 illustrates an example environment in which submissions, or "bids," for solicited application slots, or "impressions," may be generated and provided, in accordance with various implementations.

FIG. 1 illustrates an example environment in which submissions (a.k.a. "bids") for auctioned online content such as solicited application slots may be generated and provided, in accordance with various implementations. The example environment of FIG. 1 includes a submission management system 102 and a content auction computing system in the form of a demand side platform ("DSP") network 104. Each of submission management system 102 and DSP network 104 may include one or more computing systems connected by one or more network connections. An example of such a computing system is depicted schematically in FIG. 6. Submission management system 102 and DSP network 104 also may be in communication with each other via one or more networks (not depicted), such as the Internet.

Various modules or engines may be implemented as part of submission management system 102 as software, hardware, or any combination of the two. For example, in FIG. 1, submission management system 102 includes a high availability ("HA") filesystem 106 and a so-called "committer" engine 108. Operating as part of or in conjunction with HA filesystem 106 is a provisioning engine 110. Also depicted in FIG. 1 is a content delivery network ("CDN") 116, a publisher site 118, and an end user device 120, which will be described in more detail below.

DSP network 104 may include one or more digital component liaison processes 112 (also referred to as "auction processes" because they host online auctions to populate application slots, or "impressions," with digital component(s)) that operate on one or more auction servers 113. One or more auction servers 113 may be operated by the entity that hosts auctions, or they may be rented and/or leased from a third party server farm and employed to operate digital component liaison processes 112. One or more bidder servers 115 are also depicted that operate one or more digital component source processes ("DCSP") $114_{1-N}$ (also referred herein occasionally as "bidder processes" because they generate and place "bids" to populate application slots (also referred to as "impressions") with digital component(s)) for each digital component liaison process 112. In FIG. 1, the bidder servers 115 are depicted as part of DSP network 104. However, this is not meant to be limiting, and there is no requirement that bidder servers 115 be part of DSP network 104. In fact, in many circumstances, especially where the auction entity operates its own servers, it may not permit outside parties such as those that might operate DCSPs 114 to install hardware within DSP network 104. However, it may be beneficial nonetheless to minimize network hops between DCSPs 114 and digital component liaison processes 112. Accordingly, in various embodiments in which bidder servers 115 are not directly part of DSP network 104, bidder servers 115 may be installed as close as possible to DSP network, e.g., on a server farm geographically proximate to another server farm that hosts digital component liaison processes 112, or even on the same third party server farm.

Figure 6:
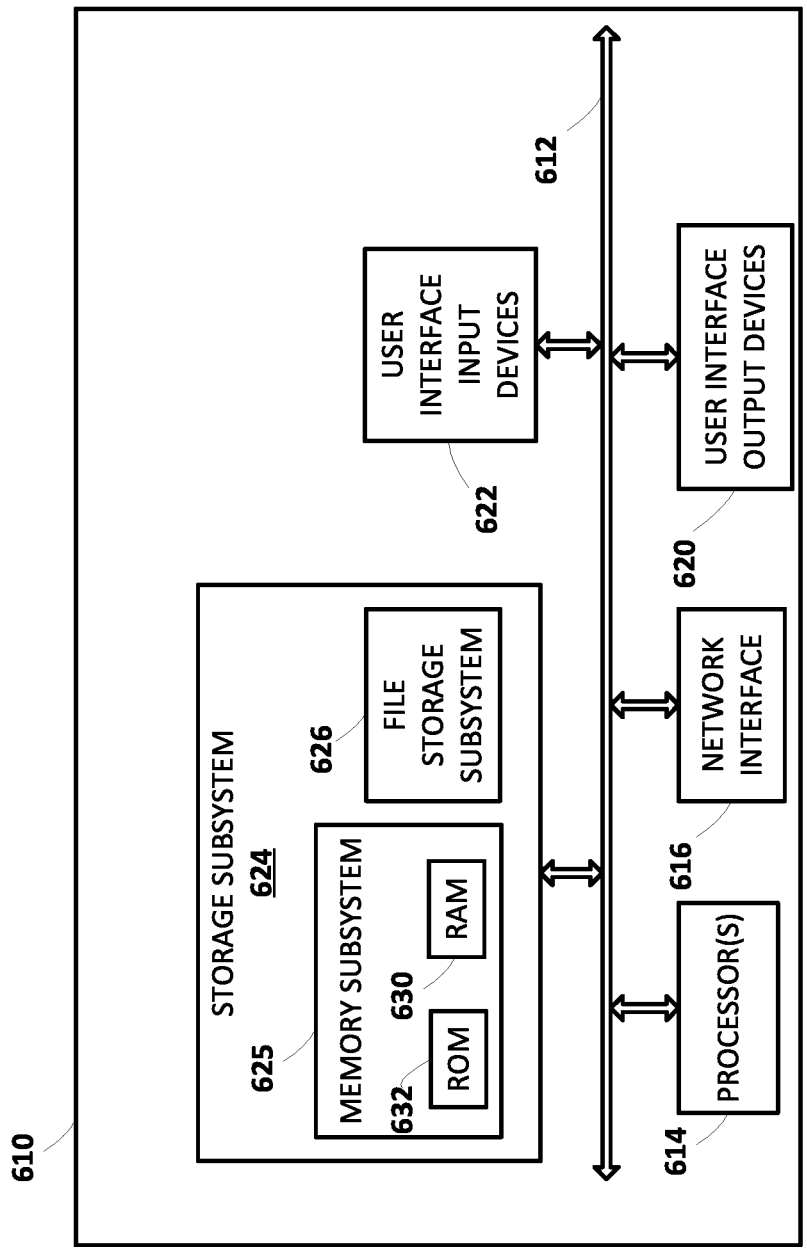
FIG. 6 illustrates an example architecture of a computer system.

The hardware components of the example environment of FIG. 1 may each include memory for storage of data and software applications, a processor for accessing data and executing applications, and components that facilitate communication over a network. In some implementations, such components may include hardware that shares one or more characteristics with the example computer system that is illustrated in FIG. 6. The operations performed by one or more components of the example environment may optionally be distributed across multiple computer systems. End user device 120 may be a computing device that can have various form factors, such as a desktop computer, laptop computer, set top box, mobile phone (a.k.a. "smart" phone), tablet computing device, a gaming console, a standalone interactive speaker, a plug-in streaming device, a so-called "wearable" computing device such as a smart watch or smart glasses, and so forth.

Generally, submission management system 102, e.g., by way of provisioning engine 110, receives, organizes, maintains, and/or makes available so-called "campaign information" in one or more databases, such as in a campaign database 122 and/or a statistics database 124. A "campaign" as used herein may refer to a deliberate and/or organized effort by an entity such as a business or political organization to announce, promote, endorse, solicit, advocate, oppose, denigrate, or otherwise distribute information pertaining to particular subject matter, such as a product, service, viewpoint, political position, etc.

In various embodiments, campaign database 122 may store campaign information pertaining to a campaign initiated, requested, or otherwise instigated by an entity such as a business or political organization. Campaign information may include but is not limited to campaign content "inventory," information about the campaigning entity, information about targeted users, campaign duration, so-called "bid paces" and "win paces" (explained in more detail below), desired wins, impression limits, spending limits, and so forth. Campaign content "inventory" may include "consumable content items" (or simply, "digital component(s)" or "digital component items") that convey announcements, promotions, endorsements, solicitations, or other positive or negative messages.

"Consumable content items," "digital component(s)," and/or "digital component items" may refer to various forms of media files that may be "consumed" (e.g., viewed, listened to, watched, or otherwise observed) by an end user. Consumable content items may include but are not limited to graphics (e.g., JPG, GIF, PNG, animations, etc.), audio content (e.g., MP3, WAV, etc.), textual content (e.g., pop ups that only display text, tickers that move across a screen, etc.), and so forth. Campaign content inventory stored in campaign database 122 may include copies of the actual media files, and/or may include identifiers that are usable to locate and/or download the media files, including but not limited to uniform resource identifiers ("URI") and/or uniform resource locators ("URL").

In some implementations, campaign database 122 may additionally or alternatively store location ordinals and/or network identifiers such as Internet protocol ("IP") addresses associated with a desired target audience. For example, an entity that initiates a campaign may provide a list of IP addresses or netmasks that match IP addresses having desired characteristics) that the entity wishes to target and/or wishes not to target. In some embodiments, a list of IP addresses provided by a campaigning entity may be IP addresses known to be associated with a particular geographic region, with one or more selected demographics, and so forth, although this is not required.

Statistics database 124 may store historical and/or statistical information associated with campaigning entities, campaign content, and/or targeted users. For example, a variety of key performance indicators may be stored in statistics database 124, including but not limited to click through rates ("CTR"), effective cost per click ("eCPC"), effective cost per action ("eCPA"), and so forth. Other information that may be stored in statistics database 124 includes but is not limited to statistics about a targeted IP address (e.g., how often do devices with that IP address engage with campaign content, what type of campaign content do devices with that IP address engage with the most, etc.), last win times of particular campaign content items, data about winning and losing bids (associated with campaigning entities, consumable content, and/or targeted IP addresses), and so forth.

In this specification, the term "database" will be used broadly to refer to any electronic collection of data. The data of the database does not need to be structured in any particular way, or structured at all, and it can be stored on storage devices in one or more locations. Thus, for example, campaign database 122 and/or statistics database 124 may include multiple collections of data, each of which may be organized and accessed differently. Also, in this specification, the term "record" will be used broadly to refer to any mapping of a plurality of associated information items. A single record need not be present in a single storage device and may include pointers or other indications of information items that may be present in unique segments of a storage device and/or on other storage devices.

In various embodiments, submission management system 102 may facilitate participation by one or more DCSPs 114 in an auction hosted by a digital component liaison process 112 of DSP network 104 as follows. An end user (not depicted) operating end user device 120 may navigate a network application 126 such as a web browser, media consumption application (e.g., streaming audio or video application), or online shopping platform to a particular online interface associated with a particular URI or URL that is hosted by publisher site 118. The online interface may include and/or be associated with one or more application slots (or "impressions").

Online interfaces will be described herein primarily as webpages rendered by web browsers. However, this is not meant to be limiting. Applications may have online interfaces in any number of forms. For example, an online shopping application may present an online interface that is populated, for instance, with information about products and/or services for sale/hire. An application slot (or "impression") associated with such an interface may include a banner, a pop-up window, a space to display a video, a space to display content in its native format, or various regions of the interface that may be populated with campaign content. As another example, an application slot (or "impression") associated with an audio or video streaming application may include a time interval between songs or videos in which multimedia content such as audio and/or visual campaign content may be presented, as well as a native files, pop up windows, or banners. Even gaming applications may include application slots (or "impressions") such as pop ups or intermittent video presentations that may be populated with campaign content. Some gaming applications may even include rendered virtual environments (two dimensional or three dimensional) with "virtual" impressions, such as billboards, sides of buses, etc., that are rendered as part of the virtual environment, and that may be auctioned for population with campaign content using techniques disclosed herein.

Publisher site 118 may direct network application 126 to load a process, or "widget," such as a so-called "supply side platform" ("SSP") widget 128, that may be associated with the online interface. SSP widget 128 may provide information about one or more impressions available through the online interface to DSP network 104. DSP network 104 may deploy an existing and/or initiate a new digital component liaison process 112 to auction the impressions. In some embodiments, SSP widget 128 may also supply information about end user device 120 and/or the undepicted end user operating it to DSP network 104. For example, in some embodiments, SSP widget 128 may provide one or more cookies associated with end user device 120 and/or network application 126 to DSP network 104. Additionally or alternatively, SSP widget 128 may supply DSP network 104 with one or more network identifiers associated with end user device 120, such as its IP address, as well as information about the impression, such as its location on a webpage, duration, prominence, etc.

The digital component liaison process 112 initiated for or charged with auctioning the impression may solicit bids from one or more DCSPs 114 that have a "seat" at the digital component liaison process 112. In some instances, the DCSPs 114 may obtain various information about end user device 120 and/or the end user operating it, e.g., from DSP network 104, SSP widget 128, or using other means. With this information, each DCSP 114 may automatically calculate a bid to populate the one or more application slots (or "impressions") with campaign content.

Some DCSPs 114 may be configured to calculate and submit bids with the assistance of submission management system 102. As will be described in more detail below, submission management system 102 may facilitate expedited automated bidding for those DCSPs 114, e.g., based at least in part on information other than cookies associated with network application 126 and/or end user device 120. In various embodiments, this expedited automated bidding may give those DCSPs 114 a competitive advantage over other DCSPs 114 that calculate and submit bids using traditional techniques, such as calculations based exclusively or predominantly on cookies associated with network application 126 and/or end user device 120.

In various embodiments, digital component liaison process 112 may accept bids for a limited time interval (e.g., on the order of milliseconds, such as sixty-millisecond promotional auctions), in which case the highest bid at the end of the time interval may win the opportunity to populate the impression with selected campaign content. In some embodiments, digital component liaison process 112 may award the impression to the first DCSP 114 that submits a bid that meets or exceeds a predetermined automatic win price. In yet other embodiments, each seat at digital component liaison process 112 may be permitted only a limited number of bids, such as a single bid. In such case, once all seats have submitted a bid (or affirmatively declined to do so), digital component liaison process 112 may award the impression to the highest bidder. Although in examples described herein, it is typically the highest bidding DCSP 114 that is awarded the impression, this is not meant to be limiting. DCSPs 114 may be awarded impressions based on other criteria, depending on the circumstances, such as the lowest bidder, or the bidder that satisfies one or more criteria in addition to a highest bid.

Once the winning DCSP 114 is determined, that DCSP 114 may be awarded an impression associated with the online interface hosted by publisher site 118. The winning DCSP 114 may submit information pertaining to the campaign content it bid to populate the impression with, such as a URI or URL, to digital component liaison process 112. Digital component liaison process 112 may in turn provide this information to SSP widget 128. SSP widget 128 may communicate with CDN network 116, which may host the campaign content, and a content streamer 130 associated with CDN network 116 may provide the campaign content to end user device 120. End user device 120 may then populate the impression with the campaign content (or "digital component(s)") downloaded from content streamer 130. For example, if the impression is a spatial portion of a webpage (e.g., on the left or on the right margin) and the campaign content is an animated image, then end user device 120 may render the animated image in the spatial portion of the webpage. Should the end user interact with the campaign content, SSP widget 128 may notify various components of DSP network 104 and/or submission management system 102 of a successful "click through."

As noted above, some DCSPs 114 configured with selected aspects of the present disclosure may calculate and/or submit bids with the aid of submission management system 102. In some embodiments, when digital component liaison process 112 solicits bids from such DCSPs 114, those DCSPs 114 may interact with and/or receive pre-calculated data (e.g., demand slope data and/or pre-calculated bids) from committer engine 108. Using such pre-calculated data, those DCSPs 114 may be able to determine and submit bids faster than other DCSPs 114 that are not configured with selected aspects of the present disclosure.

For example, committer engine 108 may provide DCSPs 114 with access to a so-called "creative" bus 134 and a so-called "IP creative" bus 136. The creative bus 134 may include information about one or more digital or "campaign" content items available in inventory of the DCSP 114. For example, through creative bus 134, a DCSP 114 may have access to one or more records 138 indexed by, for instance, a "creative ID." Each record 138 may include a creative record 140 (e.g., URI/URL associated with the consumable campaign content) and creative statistics 142 associated with the creative ID. These statistics may include but are not limited to CTR, eCPC, eCPA, and so forth.

IP creative bus 136 may provide a DCSP 114 access to information about one or more targeted users. For example, through IP Creative bus 136, a DCSP 114 may have access to a list 144 of consumable campaign content grouped by IP addresses. Each IP address record 146 may be associated with one or more targeted consumable campaign content records 148. In some embodiments, targeted IP address record 146 may contain sufficient information, such as pre-calculated data (e.g., demand slope data), for a DCSP 114 to quickly calculate a bid on an impression associated with a particular IP address. In other embodiments, one or more of creative bus 134 and/or IP creative bus 136 may provide DCSP 114 with fully pre-calculated bids. For example, bids to populate impressions associated with IP addresses provided by a campaigning entity may be pre-calculated, e.g., by committer engine 108. As the campaign progresses, the bids may be re-calculated, e.g., by committer engine 108, to account for bids won and lost, remaining desired wins, budget, spending limits, etc.

In some embodiments, when a DCSP 114 submits a bid for an impression, it may provide information about the bid it submitted to committer engine 108. Committer engine 108 may then update (or cause to be updated) one or more records in campaign database 122 and/or statistics database 124 to reflect that the bid was submitted. In some embodiments, if the bid is a winning (or losing) bid, one or more records in campaign database 122 and/or statistics database 124 may be updated further. For example, CDN 116, either directly or through SSP widget 128, may send to the winning DCSP 114 the winning second-price bid amount, and/or a "win ratio," which is a ratio of the second-price bid amount to the winning bid amount. The DCSP 114 may then update one or more event logs 150 associated with committer engine 108 with the winning bid. This may cause one or more update triggers 152 associated with committer engine 108 to cause one or more records in campaign database 122 and/or statistics database 124 to be updated. For example, update triggers 152 may cause an update engine 154 associated with provisioning engine 110 to make the database updates. In some embodiments, committer engine 108, e.g., by way of update triggers 152, may serialize updates provided to update engine 154. By serializing the data, it may be possible to perform database updates without implementing locks, avoiding lock contention.

If a DCSP 114 were required to access one or more records in campaign database 122 and/or statistics database 124 every time it was to submit a bid for an impression, the DCSP 114 may be put at a competitive disadvantage. The time required to access the database records, particularly if multiple databases and/or tables have to be accessed, as well as the time required to calculate the bid based on the retrieved data, may be too great for DCSP 114 to be competitive. Accordingly, in some embodiments, a flattened view 156 of various selected data in campaign database 122 and/or statistics database 124 may be created, e.g., periodically and/or in response to a database update performed by, e.g., update engine 154. Flattened view 156 may be made available to committer engine 108. In some embodiments, committer engine 108 may utilize flattened view 156 to populate and/or update the various records that comprise creative bus 134 and/or IP creative bus 136. In other embodiments, each update may increment counters directly, to avoid the need to count aggregates on each update. Accordingly, the result may be a logical view of totals of a log of events and a table of statistical counters that are updated directly.

Figure 2:
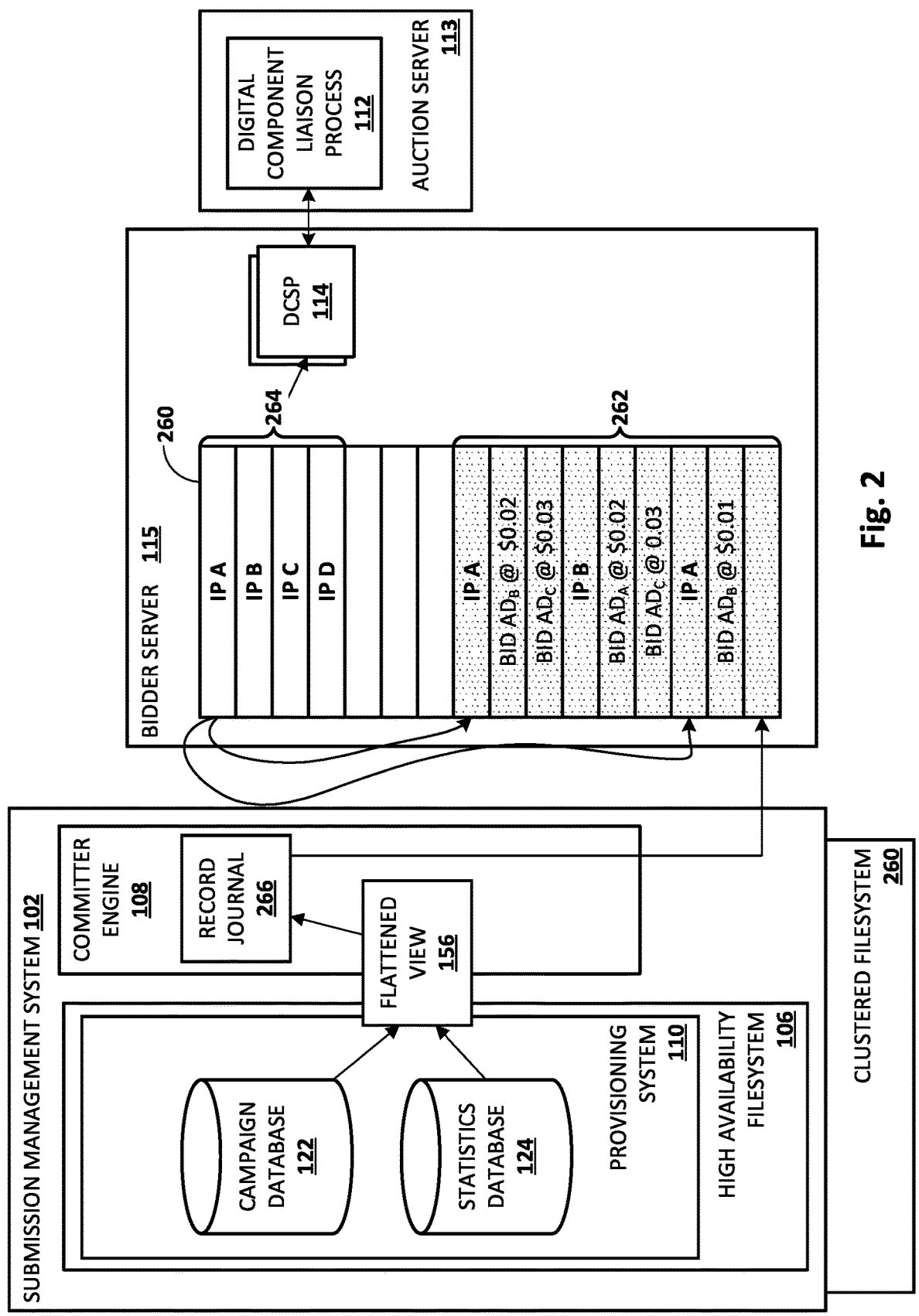
FIG. 2 illustrates in more detail than FIG. 1 certain aspects of the environment, in accordance with various embodiments.

FIG. 2 schematically depicts one example of how pre-calculated data such as demand slope data and/or pre-calculated bids may be made available by submission management system 102 to DCSPs 114, in accordance with various embodiments. Many of the components are the same as those depicted in FIG. 1, and thus are numbered the same. In some embodiments, a clustered filesystem 260 may be available to (e.g., mounted for) submission management system 102, e.g., so databases 122/124 and/or data pre-calculated and made available as part of creative bus 134 and/or IP creative bus 136 may be "cloned" at multiple sites, e.g., across the country or around the world. However, clustered filesystem 260 is not required. A single bidder server 115 is depicted in FIG. 2 operating a plurality of DCSPs 114. The DCSPs 114 have seats at an auction hosted by a single digital component liaison process 112 operating on auction server 113.

In various embodiments, volatile memory 260 of bidder server 115, which may come in various forms, such as RAM, DRAM, and so forth, may include a memory-mapped region 262 that may represent one possible physical manifestation of the creative bus 134 and/or IP creative bus 136 depicted in FIG. 1. Memory-mapped region 262 may be used to store what will be referred to herein as "bidding guidelines" or "application slot attainment parameters." "Bidding guidelines" or "application slot attainment parameters" may include pre-calculated data such as demand slope data and/or pre-calculated bids, as well as historical/statistical data associated with the IP address, a campaigning entity, location ordinals, and so forth. In some embodiments, memory-mapped region 262 may be designed to be "append only," which means that rather than updating existing records, new records that modify existing records are appended to one end of memory-mapped region 262 (e.g., the bottom of region 262 in FIG. 2, as indicated by the arrow from record journal 266).

Appending records to a database may be faster than updating existing records, which may require re-indexing of the database, a potentially time-consuming process. In addition, using append only databases in combination with relatively long-term index keys such as IP addresses, as opposed to relatively ephemeral index keys such as cookies, may alleviate pressure on bidder server 115 to perform memory allocation. Memory allocations may either be avoided entirely or slab-allocated with real-time constraints.

In some embodiments, memory-mapped region 262 may be indexed by IP addresses. Long-term index keys such as IP addresses may allow for high-overhead indexing strategies that have real-time properties. For example, a bloom filter may be employed to cull potential campaign targets by IP address. A bloom filter may not be as suitable for use with the type of randomized index keys that are typically associated with cookies.

In various embodiments, DCSPs 114 configured with selected aspects of the present disclosure may have a portion of volatile memory 260 allocated to them, e.g., by bidder server 115, for storing an index 264. Index 264 may be populated with targeted IP addresses that map to various locations within memory-mapped region 262. One example of this is demonstrated in FIG. 2 by the two arrows from the memory location within index 264 that stores "IP A" to corresponding memory locations in memory-mapped region 262 that store bidding guidelines (or "application slot attainment parameters") for "IP A" (which in this particular example are pre-calculated bids). As noted above, new records are appended to the end of memory-mapped region 262. Accordingly, index 264 associated with each DCSP 114 may be re-indexed so that an IP address points to newly appended records in addition to or instead of previously existing records. Additionally or alternatively, index 264 of each DCSP 114 may be re-indexed on demand and/or pursuant to a predetermined schedule (e.g., at scheduled intervals).

As noted above, the memory location within index 264 that stores "IP A" maps (e.g., using a pointer or other similar means) to one or more memory locations within memory-mapped region 262 that store bidding guidelines (or "application slot attainment parameters") for "IP A." These bidding guidelines (or "application slot attainment parameters") may include pre-calculated data such as demand slope data and/or pre-calculated bids that are calculated, for example, by various components of submission management system 102, such as committer engine 108. In the example of FIG. 2, "IP A" is initially mapped to two locations of memory-mapped region 262 that store instructions for DCSP 114 to bid to populate an impression associated with "IP A" with campaign inventory available to DCSP 114, namely, promotion B ("$AD_B$") and promotion C ("$AD_C$"). Promotion B has been deemed worthy of a two-cent bid, and promotion C has been deemed worthy of a three-cent bid.

Sometime later, however, another record was appended to memory-mapped region 262 that alters the bid for promotion B. As shown by the second arrow from the memory location of index 264 that stores "IP A" to memory-mapped region 262, "IP A" is also linked to an instruction to bid to populate an impression associated with "IP A" with promotion B for one cent. This may reflect a variety of circumstantial changes, such a general decrease in demand for impressions associated with "IP A," accumulation of data that demonstrates waning interest at "IP A" in subject matter associated with promotion B, depletion of campaign funds, poor performance of promotion B, and so forth. Of course, bids to populate an impression associated with a particular IP address could just as easily increase, e.g., due to increased demand for that IP address, accumulation of data evidencing interest at that IP address in particular subject matter, surplus campaign funds (especially near the end of a campaign), and so forth.

In some embodiments, memory-mapped region 262 may store historical and/or statistical records, in addition to or instead of pre-calculated bids. DCSPs 114 may use this data to calculate bids for solicited impressions, rather than simply retrieving and submitting pre-calculated bids. Historical and/or statistical records may include but is not limited to demand slope data (discussed below), CTR, and other statistics about the campaign content, as well as historical data, locational ordinals, and/or statistics pertaining to the IP address for which the impression is being populated. For example, suppose an end user device (e.g., 120 in FIG. 1) using a particular IP address in the past was operated to select (e.g., click) particular campaign content. This may be evidenced in historical and/or statistical records stored in memory-mapped region 262, and suggests that one or more users behind the IP address may be interested in subject matter to which the particular campaign content pertained. When solicited to bid for an impression associated with the same IP address again, DCSP 114 may be more likely to calculate a relatively high bid for the impression if DCSP 114 has campaign content in its inventory that pertains to the same or similar subject matter.

Figure 3:
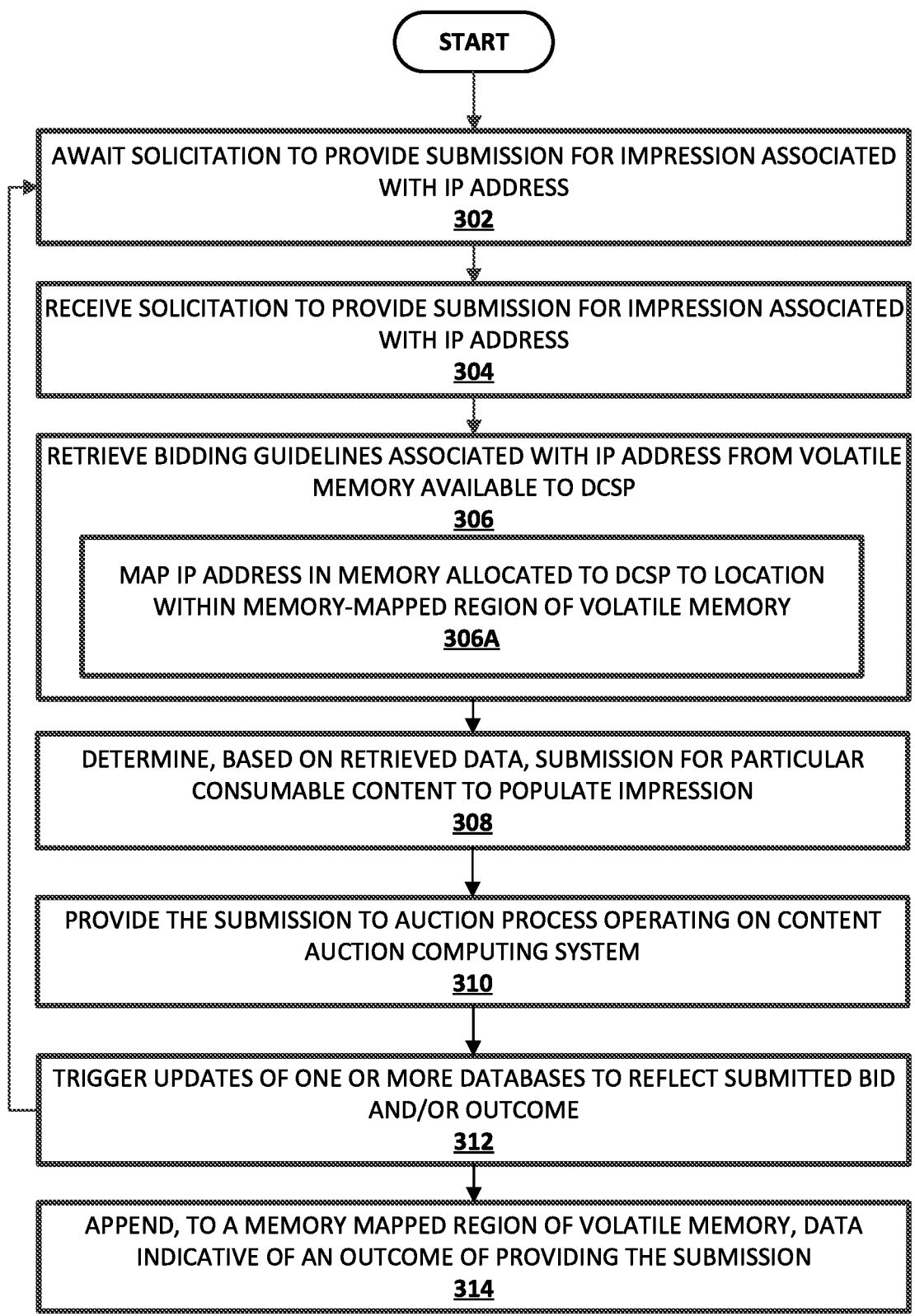
FIG. 3 is a flow chart of an example method for determining and submitting, as part of an online auction, a bid to populate an application slot associated with a network identifier with consumable digital component(s), in accordance with various embodiments.

FIG. 3 is a flow chart of an example method for automatically bidding for auctioned impressions. Other implementations may perform the steps in a different order, omit certain steps, and/or perform different and/or additional steps than those illustrated in FIG. 3. For convenience, aspects of FIG. 3 will be described with reference to one or more components of FIG. 1 that may perform the method, such as a DCSP 114 configured with selected aspects of the present disclosure.

At block 302, the DCSP 114 may await solicitation, e.g., from a digital component liaison process 112, to provide a submission for (i.e. "bid on") an impression associated with an IP address. At block 304, the DCSP 114 may receive solicitation, e.g., from a digital component liaison process 112, to provide a submission for (i.e. "bid on") on a particular impression associated with a particular IP address. As described above, the IP address (or other network identifier) may be used by an end user device 120 that operates an application with an online interface such as a webpage or a streaming audio/video interface. Such online interfaces may include impressions in various forms, such as regions of webpages, pop-up windows, time intervals between songs or videos, and so forth.

At block 306, the DCSP 114 may retrieve or otherwise obtain bidding guidelines (or "application slot attainment parameters") associated with the IP address for which the impression is solicited. As described above with reference to FIG. 2, in various embodiments, DCSP 114 may obtain/retrieve bidding guidelines (or "application slot attainment parameters") from memory-mapped region 262 of volatile memory 260 that is local to bidder server 115. For example, at block 306A, the DCSP 114 may look up in its own index 264 an IP address, and then map that IP address to an appropriate memory location of a memory-mapped region (e.g., 262) of volatile memory 260.

At block 308, DCSP 114 may determine, based at least in part on the bidding guidelines (or "application slot attainment parameters") received/obtained at block 306, a bid (or "submission") to populate the impression associated with the IP address with consumable campaign content. DCSP 114 may have various levels of discretion to determine a submission (or "bid") amount from the bidding guidelines (or "application slot attainment parameters") it receives/obtains at block 306. In some embodiments, the data may include historical data and/or statistics. DCSP 114 may use this data, alone or in combination with other data points, to calculate a bid to submit. For example, suppose the IP address associated with the impression is associated with historical data that evidences an interest in outdoor activities. Suppose further that DCSP 114 has an inventory of campaign content that includes one promotion content item related to camping and another promotion content item related to furniture. DCSP 114 may determine from data obtained at block 306 that it would submit a much higher bid to populate the impression with the camping promotional content item than it would the furniture promotional content item. Accordingly, DCSP 114 may submit the bid to populate the impression with the camping promotional content item.

But in other embodiments, and as mentioned above, the bidding guidelines (or "application slot attainment parameters") may include pre-calculated data, or even pre-calculated bids. Using the example above, in some embodiments, one submission to populate the impression associated with the IP address with the camping promotion content item and another submission to populate the impression with the furniture promotional content may be pre-calculated, e.g., by submission management system 102. These pre-calculated submissions (or "bids") may be made available to DCSP 114, e.g., by way of creative bus 134 and/or IP creative bus 136 (via memory-mapped region 262). Of course, DCSP 114 is not required to bid on every impression solicited to it. If nothing in inventory of DCSP 114 is particularly well-suited to populate a given impression (e.g., a minimum bid threshold is not satisfied, or there are no matching pre-calculated bids), then DCSP 114 may skip bidding on a particular impression. In yet other embodiments, and as will be explained below with reference to FIGS. 5A and 5B, DCSP 114 may calculate a bid in accordance with a pre-calculated demand slope.

At block 310, DCSP 114 may provide the submission determined at block 308 to a digital component liaison process 112 or other similar node. At block 312, DCSP 114 or another component may trigger an update of one or more databases, such as campaign database 122 and/or statistics database 124, to reflect that the submission was provided and/or to reflect an outcome of the submission. For example, as was depicted in FIG. 1, DCSP 114 may update one or more event logs 150, which may in turn cause update triggers 152 to initiate update engine 154 to update and/or add new records to databases 122 and/or 124. At block 314, one or more components, such as committer engine 108, may append, e.g., to memory mapped region 262 of non-volatile memory 260, one or more records indicative of the outcome of submission, which could include a newly-calculated submission.

Figure 4:
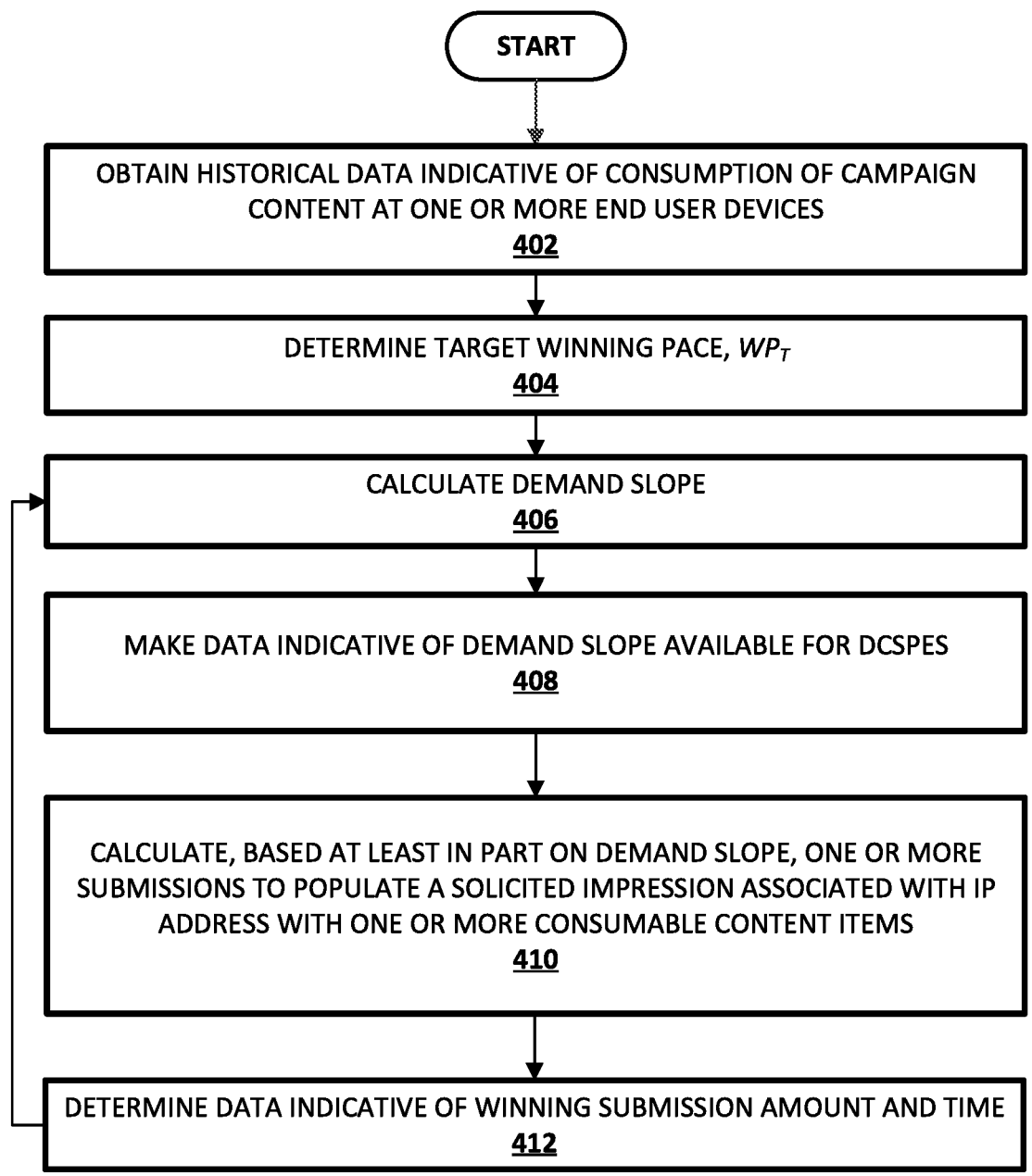
FIG. 4 is a flow chart of an example method for calculating and/or pre-calculating one or more submissions to populate an application slot with digital component(s) using demand slopes, in accordance with various embodiments.

Various techniques and/or calculations may be used by various components, such as submission management system 102 and/or DCSP 114, to generate an appropriate submission (or "bid") for a particular impression associated with a particular IP address (e.g., at blocks 308-310 of FIG. 3). One such technique 400 is depicted in FIG. 4. Various operations may be added, omitted, or reordered. The operations in FIG. 4 may be performed at various times and by various components depicted in FIGS. 1 and 2. For example, they may be performed periodically, e.g., in anticipation of receiving solicitations for submissions to populate impressions with campaign content. Additionally or alternatively, the operations in FIG. 4 may be performed "on the fly," such as in response to receipt of a solicitation to populate an impression associated with a particular IP address, or in response to a successful/unsuccessful submission. As described above, performing operations of FIG. 4 ahead of time may mean less computation will be required from DCSPs 114 to bid on impressions in real time. Less computation means quicker bids, which gives DCSPs 114 a competitive advantage.

At block 402, one or more components of submission management system 102 may obtain, e.g., from databases 122 and/or 124, historical and/or statistical data indicative of prior auction activity and/or consumption of campaign content by devices using one or more particular IP addresses. For example, and as noted above, an entity initiating a campaign may provide a list of IP addresses that it wishes to target, and the list may be stored in databases 122/124. The list may include IP addresses within a particular geographic region, or IP addresses known to be associated with particular interests or demographics. In some instances, the campaigning entity may, at the start of the campaign, provide historical/statistical data indicative of consumption of campaign content at end user devices associated with the list of IP addresses. In other instances, statistical information determined empirically from prior campaigns (e.g., associated with the same campaigning entity, associated with IP addresses demographically similar to those provided by a campaigning entity, associated with the same IP addresses, etc.) may be obtained.

At block 404, one or more components of submission management system 102 may determine a so-called "target winning pace," or $WP_T$. In some embodiments, the target winning pace may be determined initially based at least in part on an expected winning pace. An "expected winning pace" may in some embodiments be an even split of a remaining number of desired wins of a campaign across a remaining temporal duration of the campaign. As a non-limiting example, if a campaign has a duration of ten hours and a goal to win one hundred bids, then the expected winning pace may be ten wins per hour. In some embodiments, the target winning pace may be set to the expected winning pace at the outset of the campaign.

At block 406, one or more components of submission management system 102 may calculate (e.g., predict) a so-called "demand slope." In various embodiments, the demand slope may represent, as a function of time, a target bid amount to populate an actual or hypothetical solicited impression associated with one or more IP addresses with one or more particular consumable content items. On a more abstract level, a demand slope may represent demand increasing in a way that corresponds roughly (or precisely in some embodiments) with a cumulative distribution of historical winning bids. Thus, the demand slope generally may increase over time, such that the more time passes, the higher the target bid will be. An example of demand slope is discussed below with regard to FIGS. 5A-B.

At block 408, one or more components of submission management system 102 may make data indicative of the demand slope available to one or more bidder processes. For example, and as described above, DCSPs 114 may receive the data via one or more buses 134 and/or 136. The data may be made available to DCSPs 114 in various ways. For example, in some embodiments, committer engine 108 may append records to memory-mapped region 262. DCSPs 114 configured with selected aspects of the present disclosure may re-index their local indexes 264 in order to map IP addresses to these newly-appended records.

At block 410, a DCSP 114 and/or one or more components of submission management system 102 may calculate one or more submissions (or "bids") to populate the solicited impression with one or more consumable content items. This may be done at various times, such as in response to solicitation of a DCSP 114 to bid on an impression at block 304 of FIG. 3. This calculation may be based at least in part on the data indicative of the demand slope made available at block 408. For example, depending on time elapsed since the start of an auction, a DCSP 114 may map the elapsed time to a corresponding bid amount located on the demand slope, and then submit that bid to digital component liaison process 112.

At block 412, a DCSP 114 and/or one or more components of submission management system 102 may determine data indicative of a winning submission (or "bid") amount and the time at which the bid won. This data may then be used to recalculate the demand slope at block 406. Generally speaking, if the bid amount and/or time is behind demand pace, the demand slope may be recalculated to be steeper, so that DCSPs 114 may make higher bids and/or bid more quickly in order to "catch up" with demand. If the bid amount and/or time is ahead of demand pace, the DCSP 114 may be paying too much for impressions. The demand slope may be recalculated to be less steep, so that DCSPs 114 may make lower bids and/or bid more slowly in order to save money.

Figure 5A:
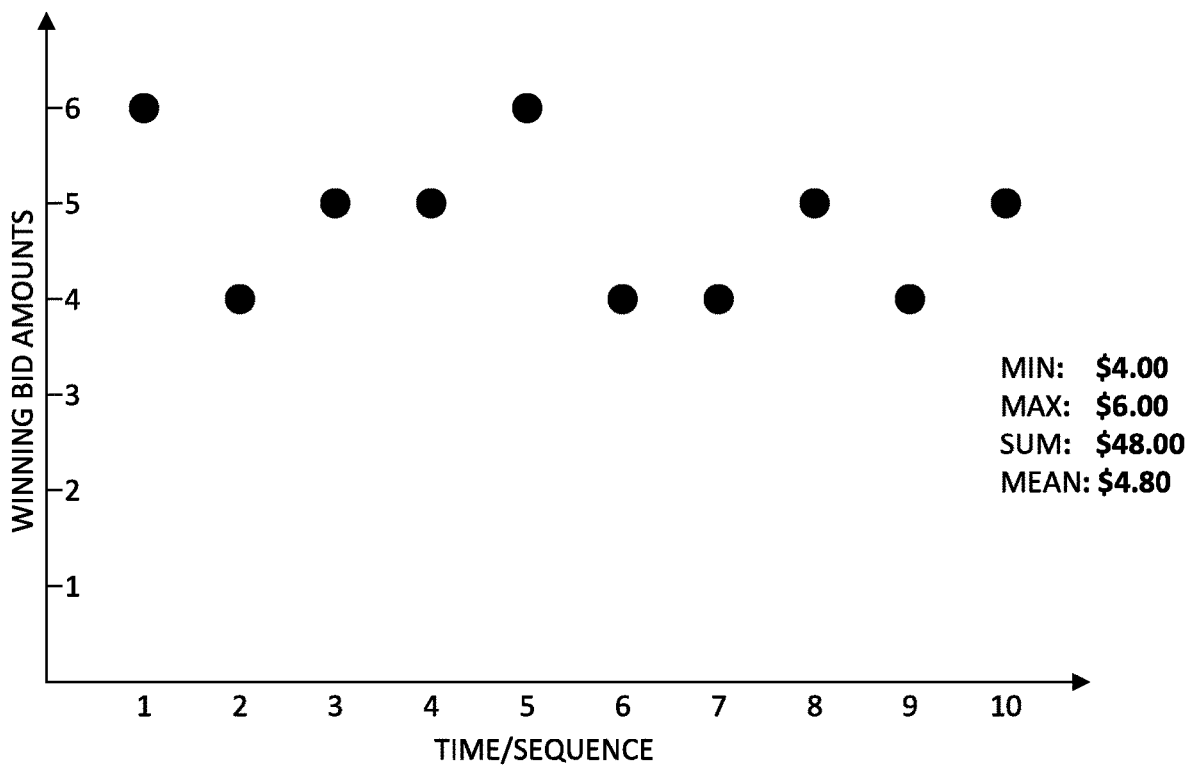
FIGS. 5A and 5B demonstrate visually how example demand slopes may be calculated and recalculated, in accordance with various embodiments.
Figure 5B:
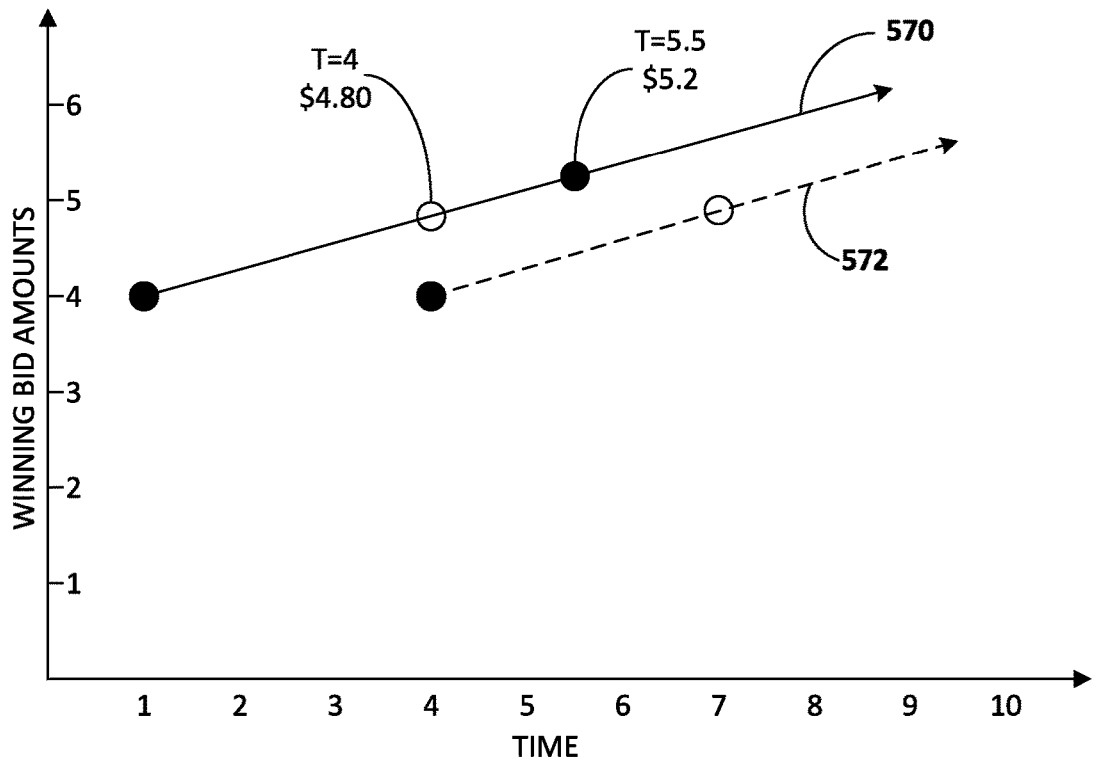

FIGS. 5A and 5B are graphs that visually demonstrate how demand slopes may be calculated and recalculated, in accordance with various embodiments. FIG. 5A graphically depicts an auction history associated with, for instance, a particular targeted IP address or group of IP addresses, a particular creative, all creatives for a particular bidding entity, all creatives across a class of bidding entities, and so forth. The Y axis represents winning bid amounts and the X axis represents a sequence in which those bid amounts were won. The winning bid amounts are shown in a particular sequence for illustrative purposes only. In various embodiments, only statistics related to those winning bid amounts, such as the minimum winning bid amount and/or the mean winning bid amount, are used in disclosed techniques, and the sequence and/or time in which winning bids were made is irrelevant.

In FIG. 5A, it can be seen that there were ten successful winning bids. The minimum winning bid was $4.00, the maximum was $6.00, the sum of all bids was $48.00, and the mean winning bid amount ($48.00/10) was $4.80. In various embodiments, this data may be used to project a demand slope that may be used to select bid amounts for subsequent impressions. FIG. 5B depicts one example of how this might work. Of course, real life historical data may potentially include more (or less) than ten successful bids, and the bid amounts may not necessarily be limited to one dollar increments as is depicted in FIG. 5A (this is done in this example for simplicity's sake only).

In FIG. 5B, the Y axis represents bid amounts. Unlike the graph of FIG. 5A, in which the X axis only loosely represented time and/or a sequence of winning bids, in FIG. 5B, the X axis represents actual time because online content auctions typically occur in real time, and impressions may become available for bidding at a non-regimented pace, e.g., in spurts and/or at random time intervals. In this example, the minimum historical bid of $4.00 is used at time T=1 as a starting point for an initial demand slope 570. Initial demand slope 570 may represent an amount that a particular bidder process (e.g., 114 in FIG. 1) will bid at any given moment in time. It can be seen that as time passes without a winning bid, the amount the bidder process will bid increases.

Suppose a DCSP 114 is expected to win at a pace of approximately every three seconds. That would mean the DCSP 114 is expected to win at T=4 for approximately $4.80 (as indicated by the white dot), which was the mean winning bid amount calculated from the winning bids depicted in FIG. 5A. However, the DCSP 114 doesn't actually win a bid until T=5.5 for an amount of $5.20. This indicates that the DCSP 114 is bidding slightly behind pace of demand. Accordingly, the demand slope may be increased.

In some embodiments, a DCSP 114 (or another component on its behalf) may calculate a new demand slope in response to a determination that bidding is ahead of or behind demand pace. For example, in FIG. 5B, bidding is behind pace of demand, and so a new demand slope 572 has been calculated. The new demand slope 572 begins at the last expected win time of 4 and, in keeping with the expected win pace of three seconds, is calculated to win at T=7 for $4.87 ((48+5.2)/(10+1)=$4.87). This results in new demand slope 572 being slightly steeper than previous demand slope 570, which is an attempt to "catch up" the bidding pace with the increased demand.

The demand slopes depicted in FIGS. 5A and 5B are linear, but this is not meant to be limiting. In other embodiments, more complex curves may be employed to determine bid amounts at various points in time. In some embodiments, a demand slope may have a curve shape that compensates for historical observed winning bid distributions. Additionally or alternatively, in some embodiments, rather than basing a demand slope on all historical data, a sliding window may be employed to keep enough samples to quickly sort and obtain, for instance, quartiles of recent history. This recent history may be translated into a variance, which in turn may be used to compute a cumulative curve, rather than a straight line.

In various implementations, a variety of other factors may be taken into consideration when determining bid amounts. For example, FIGS. 7-8 demonstrate one non-limiting example of how so-called "location ordinals" may be sampled and used.

FIG. 6 is a block diagram of an example computer system 610. Computer system 610 typically includes at least one processor 614 which communicates with a number of peripheral devices via bus subsystem 612. These peripheral devices may include a storage subsystem 624 including, for example, a memory subsystem 626 and a file storage subsystem 626, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, a wearable visual display unit, a graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, a wearable device such as a smart watch or smart glasses, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform one or more of the methods described herein such as, for example, the methods and techniques demonstrated by FIGS. 3-5 and/or 7-8.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624 or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

A number of technical advantages in addition to those already described may be realized using techniques disclosed herein. For example, calculating submissions (or "bids") based on IP addresses associated with impressions, as opposed to, say, cookies, may enable use of historical and/or statistical data associated with IP addresses. Thus, if a particular entity wishes to initiate a campaign targeted towards a group of IP address with known histories and/or statistics, it may be possible to more accurately project future activity associated with those IP addresses, facilitating more accurate campaign cost estimation ahead of time. Another technical advantage is that by facilitating relatively quick bidding (e.g., due to the availability of pre-calculated data such as pre-calculated bids), it is less likely that a DCSP 114 will timeout before the end of an auction. Having lower timeout frequency may enable a campaign to have greater reach. Yet another technical advantage of employing techniques described herein is that it is easier to predict traffic flow associated with IP addresses than it is to predict traffic flow associated with cookies, since cookies may have little to no history. Thus, techniques described herein may facilitate improved pace of spending on impressions to satisfy various campaign constraints, particularly over pace of spending on impressions associated with cookies.

Figure 7:
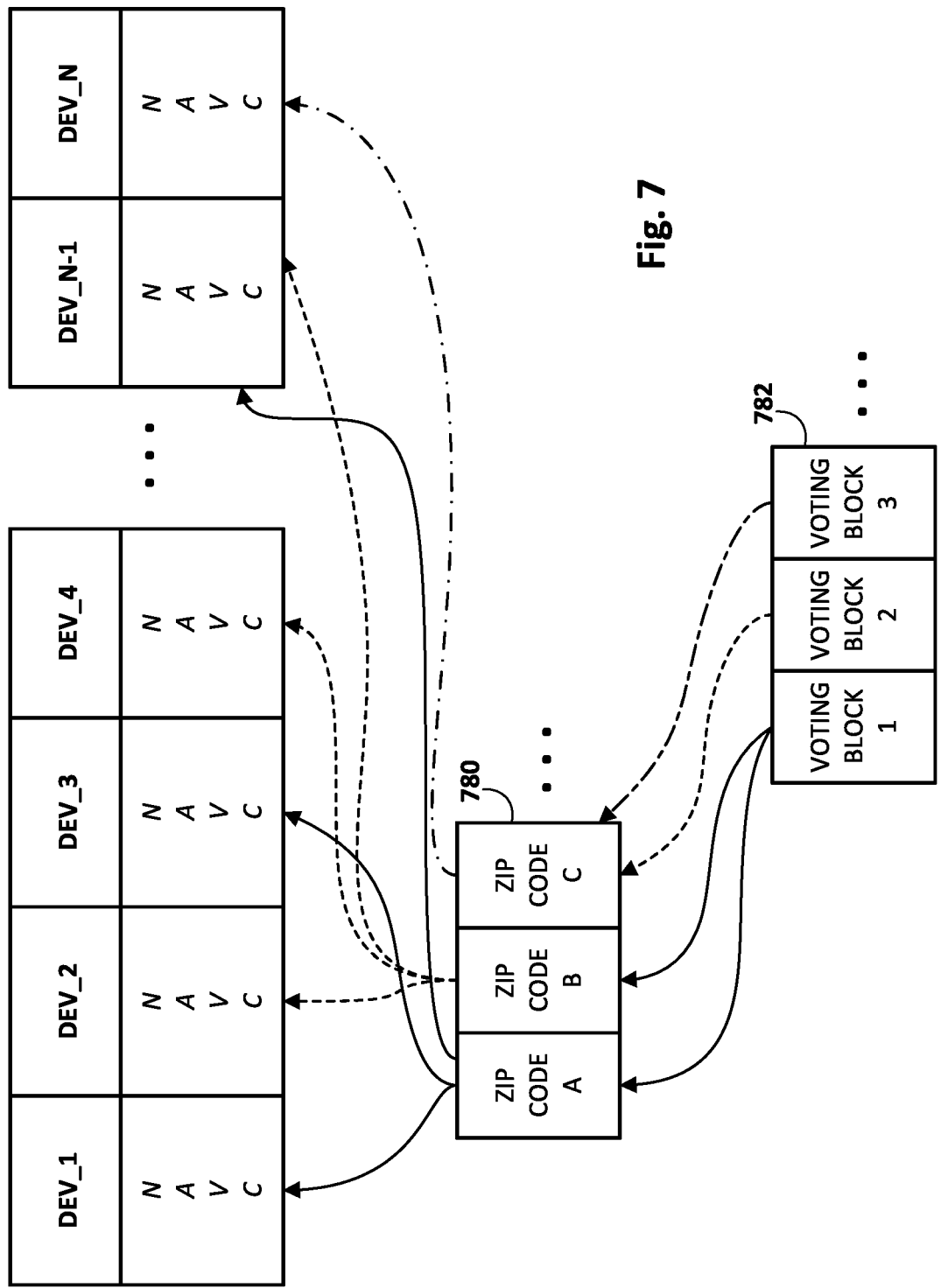
FIG. 7 schematically illustrates one example of how geographic data such as location ordinals may be accumulated for use in generating and providing submissions to populate solicited application slots with digital component(s).

FIG. 7 schematically depicts one example of how location ordinals may be used to aid in the process of determining and providing submissions to populate application slots with digital component items. As used herein, "location ordinals" may refer to numeric indications of geographic location that are ordered in some way to logically indicate locations, in some cases relative to one another. One example of a location ordinal is a Zone Improvement Plan ("ZIP") code. The first three digits of a ZIP code describe the sectional center facility, and the final two digits correspond to specific post offices served by the sectional center facility. In addition, the earlier digits of a ZIP code convey geographic information at a relatively high level. For example, the first digit "0" is allocated to states primarily in the Northeastern United States. The first digit increases southward/westward. Thus, for instance, Maine is assigned the first digit of "0," Pennsylvania "1," Maryland "2," Tennessee "3," Kentucky "4," South Dakota "5," Kansas "6," Texas "7," Arizona "8," California "9," and so on. Other location ordinals exist for designated locations, such as voting blocks, census blocks, etc. Yet another type of location ordinal is a latitude/longitude that might be represented, for instance, by a Global Positioning System ("GPS") coordinate.

At a high level, information generated from location ordinals may be used to intelligently and competitively generate and provide submissions to populate solicited application slots with digital component(s). Location ordinal "samples" may be received from various sources. In some embodiments, incoming location ordinal samples may be received from individual computing devices (e.g., smart phones, smart watches, vehicle computing systems, etc.) and/or from intermediate nodes (e.g., telecommunication infrastructure, call detail records ("CDR"), etc.). These samples may be accumulated and used to determine various geographic attributes of the source computing devices (and hence, of the users that operate them). These geographic attributes may then be used to determine whether to target application slots associated with particular device identifiers, as well as how to target the application slots (e.g., how much to bid, the aforementioned demand curves, etc.).

In some embodiments, incoming location ordinal samples may be used on a continuing basis to update so-called "cluster distributions" (described in more detail below) associated with each device identifier, e.g., so that decisions made pertaining to each device identifier are based on the most recent data available. In some embodiments, the cluster distributions may be processed (e.g., flattened into a relational database and/or used to generate application-specific views from such a database) and stored in volatile memory that is available locally to the digital component source processes (114, also referred to above as "bidder processes"). That way, the cluster distributions are readily and quickly available to the digital component source processes 114, enabling them to more intelligently and efficiently (and competitively) generate submissions to populate application slots with digital component(s). In this way, an arbitrary, horizontal set of observational data (e.g., location ordinals) may be used to generate solutions (e.g., database views, predetermined application slot attainment parameters) oriented for particular market verticals (e.g., consumers in particular ZIP codes, voting blocks, census blocks, etc.).

In FIG. 7, an array of so-called "cluster elements" is depicted that includes cluster elements DEV_1-DEV_N. Each cluster element represents a particular computing device (e.g., a smart phone, smart watch, vehicle computing system, etc.) that corresponds to a device identifier (e.g., an IP address, etc.). Thus, in some embodiments, the array of cluster elements may be indexed by device identifiers. In some embodiments, the device identifier may be unique to the particular device, although this is not required. For example, a single device may be assigned multiple different IP addresses as an operator of the device travels around. In such a scenario, assuming IP addresses are used as the device identifiers, then that particular device may be represented by multiple cluster elements. The array of cluster elements depicted in FIG. 7 may be stored in various locations, such as at submission management system 102 (e.g., in statistics database 124). As described above, various information associated with the array of cluster elements, particularly location ordinals and other information associated with each cluster element, may be used for various purposes, such as determining whether to generate and provide a submission to populate an application slot with digital component(s), as well as how the submission will be generated (e.g., appropriate bid amounts).

Each cluster element also includes information about the corresponding device, and in particular includes information about one or more received location ordinal samples associated with the device. Based on these incoming samples, each cluster element may be updated to include the most up-to-date geographic information about the particular computing device. For example, position coordinates (e.g., GPS) received from a particular computing device may be sampled in a loosely temporal order (e.g., periodically, continuously, on demand, pushed, pulled, etc.) and added to the corresponding cluster element (i.e. the cluster element that is indexed by the corresponding device identifier).

Storing all sampled location ordinals associated with each computing device may be impractical. There may be numerous cluster elements corresponding to numerous computing devices, and each computing device may provide an ever-increasing number of individual locational ordinals over time. Storing all of this data may be cost-prohibitive. Moreover, performing computations of such large amounts of data may be computationally expensive and perhaps most importantly, may take too much time. As noted above, the more time required to compute data that may be used to generate and provide submissions to populate solicited application slots with digital component(s), the greater the competitive disadvantage.

Accordingly, rather than simply storing all location ordinals, or even subsets of location ordinals obtained during a particular time period (e.g., as a sliding window), in various embodiments, techniques may be employed to process incoming location ordinals and reduce them into easily computable and/or digestible summary data, which will be referred to herein as "cluster distributions." Despite cluster distributions in some cases being lossy, they are nevertheless sufficient to perform various calculations necessary to make competitive submissions to populate application slots with digital component(s).

In FIG. 7, for example, each cluster element stores a sample size N, a recency-weighted average A, a recency-weighted variance V, and a sample count C. For convenience, each incoming sample (or input) will be referred to by the letter S. The values N, A, and V may be updated each time a new location ordinal S is received. In some embodiments in which the location ordinals take the form of multi-element tuples (e.g., <latitude, longitude>), separate values N, A, and V may be stored for each tuple element, although this is not required.

The sample size N represents a target number of samples to be included in the summary data calculations of A and V. In a way, the sample size N may operate similarly as a sliding window of N samples that are retained. However, in many embodiments, individual samples are not retained. Rather, individual samples are used on an incoming basis to recalculate the values A and V. The sample count C may be the number of actual received samples considered for each equation at any given point in time. As will become evident, recalculating the values A and V on such a rolling basis reduces the number of calculations necessary (which given the potential enormous numbers of incoming samples may be considerable) while weighting the values A and V based on the N most recently-received samples.

For example, in some embodiments, the recency-weighted average A may calculated on a rolling basis using the following equation:

$$A\mathrel{+}=(S-A)/\min(C,N) \quad \text{equation (1)}$$

Similarly, the recency-weighted variance V may be calculated on a rolling basis using the following equation:

$$V\mathrel{+}=((S-A)^2-V)/\min(C,N) \quad \text{equation (2)}$$

In some embodiments in which a cluster element is implemented as an object, the object may include built-in functions corresponding to these equations. In an initial state of each cluster, i.e. at time T=0, the values A and V represent a mean average of all samples until T=N. After that, these values act as rolling averages/variances but where the sample dropped off the edge of the sliding window is assumed to be the current value of A/V. Thus, the values A and V for a given cluster element may represent a cluster distribution of the incoming sample values.

As can be seen from the above equations and explanation, each incoming sample S changes the recency-weighted average A in proportion to the sample window size N, and the difference between an unweighted average and the recency-weighted average A is simply that the window size N has a maximum value that locks the bias of the most recent sample. In other words, the current average A and variance V are persisted as part of a state of the cluster element. When a new sample S is received, the current values of A/V are updated as deltas in proportion to a window size N, simply dividing the delta by the window size N. For an average, this is logically equal to simply adding up all of the retained sample value and dividing the sum by the window size N after the sum is collected, because moving 1/N means that the rest of the samples remain with the strength of (N−1)/N.

An upper bound on the proportion effectively biases for recent samples as if it were a rolling average of that window size N, but with an infinite response. That is because the state of the cluster element (i.e., the values of A and V) is adjusted little by little. Thus the state effectively represents a rolling average for N set of samples, but with an initial state that represents the effects of the prior infinite impulse. The strength of the older values, which should be (C−1)/C end up with the strength of (N−1)/N, so their strength gradually diminishes towards zero.

In some embodiments, the recency-weighted variance V can be reformulated into a normal distribution curve which aligns with (e.g., effectively represents in succinct form) the recency-weighted variance V for probabilistic comparisons. The sample window length N may be calibrated for lower, narrower deviations, suited to how often the computing device generating the location ordinal samples moves in space. For example, two cluster element variables, one representing longitude and the other latitude, can be used to represent an oval that outlines a 95th percentile area that is estimated to cover 95% of coordinate samples, including a bias for recent samples. Simply multiplying the deviation by two estimates the 95th percentile, assuming a normal distribution of the samples.

As noted above, the array of cluster elements may be indexed by a device identifier. For example, in some embodiments, the array may be sorted by device identifiers. This expedites locating and updating a cluster distribution of a particular cluster element when an applicable incoming sample arrives. However, the array of cluster elements may be indexed by other values as well. In various embodiments, other "alternative" indices (sometimes referred to as "spatial" or "locational" indices) may be established that are searchable using location-centric input to locate individual cluster elements using other types of values. These other values may be associable with the cluster distributions of the individual cluster elements.

For example, in FIG. 7, a first alternative index 780 includes a plurality of ZIP codes. Only three ZIP codes are depicted in FIG. 7 but as indicated by the ellipses, any number of ZIP codes may be included in such an alternative index. In various embodiments, each ZIP code may be indexed to any cluster elements with cluster distributions that suggest a corresponding computing device is somehow related to the ZIP code. For example, suppose a user resides in a particular ZIP code. A smart phone carried by the user will likely generate a relatively large number of location ordinal samples within that ZIP code—a fact that will be reflected in the values A and V of a cluster distribution associated with the device identifier of the user's smart phone. Even if the user travels to other ZIP codes periodically, it is likely that the user's smart phone cluster distribution will indicate that the user spends at least a threshold amount of time (e.g., the majority) in the particular ZIP code. In some embodiments, the particular ZIP code of alternative index 780 may therefore be linked to (e.g., searchable as an index for) the cluster element associated with the device identifier of that user's smart phone.

Similarly, suppose the same user works in a second, different ZIP code. Because the user likely spends at least a substantial amount of time in the second ZIP code, a substantial number of location ordinal samples generated by the user's smart phone will be located within the second ZIP code. This once again will be reflected in the values A and V of the user's smart phone cluster distribution. Consequently, the second ZIP code of alternative index 780 may also be linked to the cluster element associated with the device identifier of the user's smart phone.

In FIG. 7, ZIP Code A is linked to cluster elements DEV_1, DEV_3, and DEV_N−1, as indicated by the solid arrows, e.g., because the cluster distributions of those cluster elements suggest the corresponding computing devices generated at least some location ordinal samples within those ZIP codes. Similarly, ZIP code B is linked to DEV_2, DEV_4, and DEV_N−1 as indicated by the dashed arrows, and ZIP code C is linked to DEV_N as indicated by the dash-dot-dash arrow. Thus, for example, if a particular campaign wished to target consumers located in ZIP code A, the campaign could search by ZIP code A and receive the device identifiers DEV_1, DEV_3, and DEV_N−1.

In some embodiments, links between alternative index elements and cluster elements may have assigned weights or probabilities. For example, if a cluster distribution of a particular cluster element indicates that the corresponding computing device generated a relatively large number of location ordinal samples within a particular ZIP code, then a link between the particular ZIP code and the particular cluster element may be assigned a relatively large weight. By contrast, if a cluster distribution of a particular cluster element indicates that the corresponding computing device generated a relatively small number of location ordinal samples within a particular ZIP code, then a link between the particular ZIP code and the particular cluster element may be assigned a relatively small weight.

FIG. 7 also includes another alternative index 782 that may be established to index the array of cluster elements based on relationships between the cluster distributions and voting blocks (assuming the voting blocks qualify as location ordinals). Similar to the ZIP codes, while only three Voting Blocks are depicted, the ellipses indicate that any number of Voting Blocks may be used in alternative index 782. The links between the voting block elements and the individual cluster elements are not depicted in FIG. 7 for the sakes of brevity and clarity, but when present may operate much in the same way as the links between the ZIP codes and the individual cluster elements. However, it is not required that every alternative index link directly index (e.g., link to) the array of cluster elements. In some embodiments, a first index may link to a second alternative index, and only the second alternative index may directly index the array of cluster elements.

For example, in FIG. 7, links are depicted between the alternative index 782 of voting blocks and the alternative index 780 of ZIP codes. Such multi-tier indices may be generated based on relationships between the individual elements of each index. For example, Voting Block 1 is related to ZIP codes A and B, as indicated by the solid arrows. This may indicate, for instance, that Voting Block 1 overlaps geographically with ZIP codes A and B, is contained within ZIP codes A and/or B, encompasses ZIP codes A and/or B, etc. Similarly, Voting Blocks 2 and 3 are related to ZIP code C, as indicated by the dashed arrow and by the dash-dot-dash arrow. And while not shown in FIG. 7, the links may work in the reverse direction as well (e.g., ZIP codes may be linked to Voting Blocks, which in turn may be linked directly to individual cluster elements). In some embodiments, links between individual elements of alternative indices may be assigned weights that represent strengths of relationships. For example, if 40% of Voting Block 1 is located in ZIP Code A and 60% of Voting Block 1 is located in ZIP Code B, then the corresponding links (or edges) may be assigned appropriate weights, such as 0.4 and 0.6.

The net effect of the multiple alternative indices and their weighted links to each other and/or individual cluster elements is essentially a graph (which is apparent when viewing FIG. 7 as a whole) in which individual cluster elements correspond to leaf nodes, individual elements of alternative indices correspond to parent nodes (including a root node in some instances), and links between the various elements represent edges of the graph. In various embodiments, this graph may be implemented as a schema that directs traversal along the array of cluster elements and associated alternative indices. Each edge may include calibrated information (e.g., weights, probabilities) that is indicative of a statistical independence of each relationship. Thus, for example, as the graph is traversed along multiple tiers, these statistical independences may influence the proportional weight as each probability is iteratively multiplied into the previous calculations.

Figure 8:
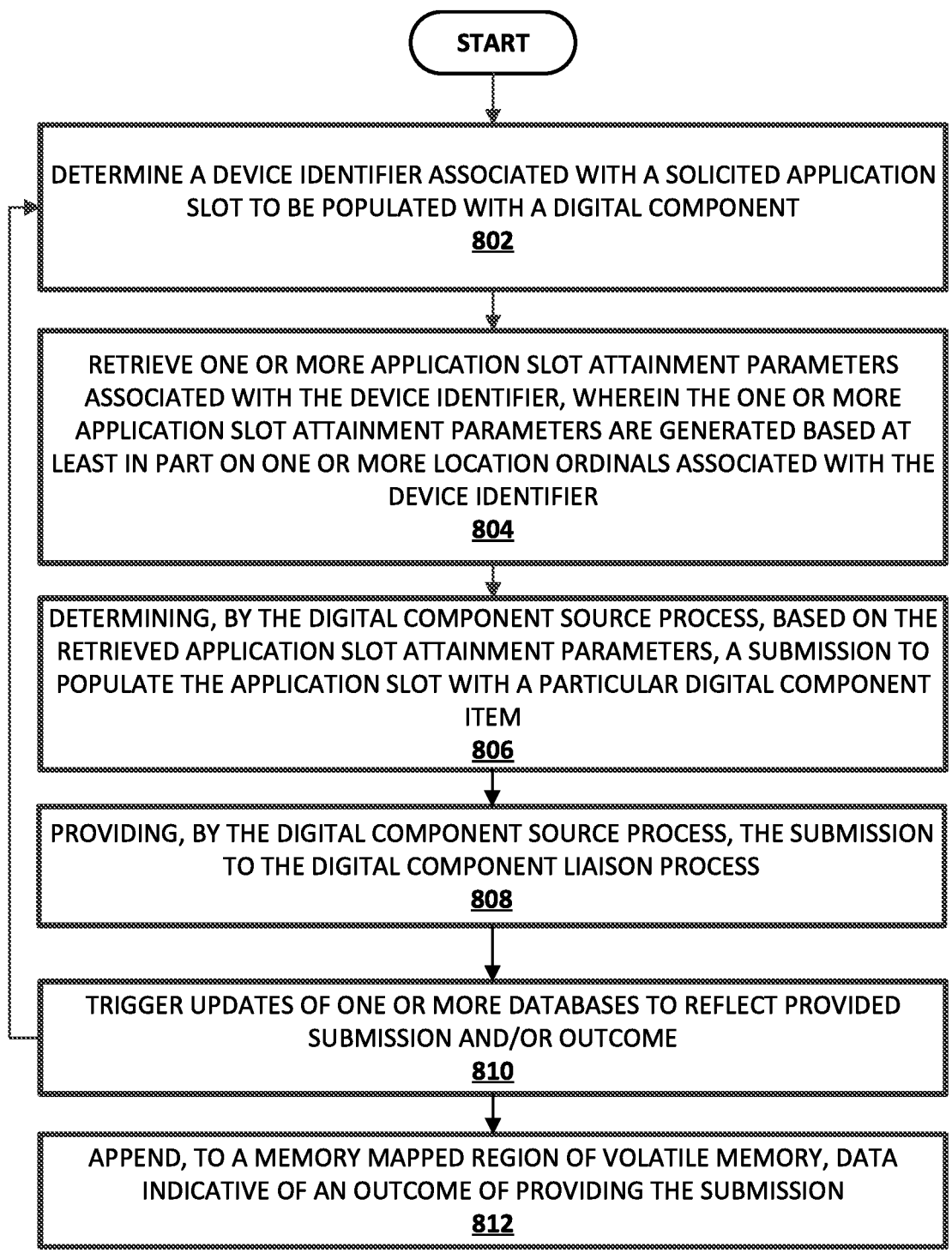
FIG. 8 is a flow chart of another example method, in accordance with various embodiments.

FIG. 8 schematically depicts on example method 800 for using locational ordinals to generate and provide submissions to populate application slots (or "impressions") with digital component(s). For convenience, the operations of the flow chart are described with reference to a system that performs the operations. This system may include various components of various computer systems, including submission management system 102, committer engine 108, and/or bidder servers 115. Moreover, while operations of method 800 are shown in a particular order, this is not meant to be limiting. One or more operations may be reordered, omitted or added.

At block 802, the system may determine, by way of a digital component source process 114 (or "bidder process") executing on a first computing system, a device identifier associated with an application slot (or "impression") to be populated with digital component(s). In various implementations, the application slot may be solicited by a digital component liaison process (or "auction process") executing on the first computing system or a second computing system. Operations associated with block 802 may be similar in some ways to operations associated with block 304 in FIG. 3.

At block 804, the system may retrieve, e.g., by way of the digital component source process 114, one or more application slot attainment parameters associated with the device identifier. In various embodiments, the one or more application slot attainment parameters may be generated based at least in part on one or more location ordinals associated with the device identifier. For example, the application slot attainment parameters may be generated based at least in part on cluster distributions associated with individual cluster elements such as those depicted in FIG. 7, and/or based on other data such as the demand curves described previously. Operations associated with block 804 may be similar in many ways to operations associated with block 306 in FIG. 3.

At block 806, the system may determine, e.g., by way of the digital component source process 114, and based on the retrieved application slot attainment parameters, a submission to populate the application slot with a particular digital component item. For example, the application slot attainment parameters may include predefined bids for particular ZIP codes (or other location ordinals), demand curves for particular location ordinals, etc. Thus, a highly coveted ZIP code may be associated with application slot attainment parameters that influence a digital component source process (or "bidder process") to place a relatively high bid to populate application slots associated with that ZIP code with digital component(s). Operations associated with block 806 may be similar in many ways to operations associated with block 308 in FIG. 3.

At block 808, the system may provide, e.g., by the digital component source process, the submission to the digital component liaison process. This operation may be similar in many ways to operations associated with block 310 of FIG. 3. At block 810, the system may trigger updates of one or more databases to reflect the provided submission and/or outcome, similar to block 312 of FIG. 3. At block 812, the system may append, e.g., to a memory mapped region of volatile memory that is available locally to the digital component source process 114, data indicative of an outcome of providing the submission, similar to the operations associated with block 314 of FIG. 3.

It should be understood that operations described in association with FIG. 3 and operations described in association with FIG. 8 are not meant to be mutually exclusive. To the contrary, and as noted above, many of the operations are similar, and operations described with respect to either Fig. may be performed in conjunction to enable digital component source processes to generate and provide competitive submissions to populate application slots with digital component(s).

In some embodiments, one or more of the array of cluster elements and any alternative indices may be flattened into a format more appropriate for storage, for instance, in a relational database. Consequently, the relational database may store object-to-object probabilities that may be used, e.g., by various components described herein, to generate and provide submissions to populate application slots with digital component(s). In some embodiments, one or more relatively complex application-specific views may be generated for such a relational database. Each application-specific view may be tailored to make tailored information available quickly to applicable components, such as digital component source processes that are meant to target a particular market vertical (e.g., users in particular ZIP codes, users in particular census blocks, etc.). In some embodiments, these application-specific views may be journaled, e.g., as part of buses 134, 136 in FIG. 1, so that they are available in volatile memory that is local to a digital component source process 114.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method that is implemented by one or more processors of a first computing system, comprising:
    receiving, by a bidder process executed by the one or more processors of the first computing system, a solicitation for bids to an auction process to populate an application slot with one or more digital components, wherein the auction process is executed by a second computing system that is in network communication with the first computing system;
    in response to the determining, obtaining, by the bidder process from the solicitation, a device identifier of an end user computing device at which the application slot is to be populated with one or more digital components;
    retrieving, by the bidder process from memory of the first computing system, one or more bidding guidelines associated with the device identifier, wherein the one or more bidding guidelines are generated based at least in part on a geographic area that is estimated to contain a given percentile of a plurality of location ordinal samples accumulated over time by the end user computing device as it is carried among a plurality of geographic locations;
    determining, by the bidder process, based on the retrieved bidding guidelines, a bid to populate the application slot with a particular digital component; and
    providing, by the bidder process, the bid and a selected digital component to the auction process executed by the second computing system.

2. The method of claim 1, wherein the one or more bidding guidelines associated with the device identifier are retrieved from volatile memory local to the first computing system executing the bidder process.

3. The method of claim 1, wherein the one or more bidding guidelines associated with the device identifier are generated based on statistical analysis of the plurality of accumulated location ordinal samples.

4. The method of claim 3, wherein the statistical analysis includes estimating the geographic area that represents the given percentile of the plurality of accumulated location ordinal samples.

5. The method of claim 4, wherein the geographic area is estimated based on a standard deviation calculated based on the plurality of accumulated location ordinal samples.

6. The method of claim 1, wherein the plurality of accumulated location ordinal samples comprise a plurality of position coordinates.

7. The method of claim 1, wherein the plurality of accumulated location ordinal samples comprise a plurality of Zone Improvement Plan ("ZIP") codes.

8. A method implemented using one or more processors, comprising:
    obtaining, by one or more of the processors, a plurality of location ordinal samples accumulated over a period of time by a computing device having a device identifier;
    estimating, by one or more of the processors, a geographic area that represents a given percentile of the plurality of location ordinal samples accumulated by the computing device;
    determining, by one or more of the processors, based on demand curves or predefined bids associated with the geographic area, one or more bidding guidelines associated with the device identifier;
    subsequent to the one or more bidding guidelines being determined, providing, by one or more of the processors, the one or more bidding guidelines to a bidder process to enable the bidder process to submit a response to a solicitation for bids from an auction process to populate an application slot associated with the computing device having the device identifier with a digital component.

9. The method of claim 8, wherein the one or more bidding guidelines are generated based on statistical analysis of the accumulated location ordinal samples.

10. The method of claim 8, wherein the device identifier is one of a plurality of device identifiers, and the method further includes generating, for a given device identifier of the one or more device identifiers, a given cluster element that includes one or more location ordinal samples obtained from a client device associated with the given device identifier.

11. The method of claim 10, further comprising generating an array of cluster elements that includes the given cluster element, wherein each cluster element of the array of cluster elements is indexed based on a device identifier.

12. The method of claim 10, wherein the plurality of accumulated location ordinal samples comprise a plurality of position coordinates.

13. The method of claim 10, wherein the plurality of accumulated location ordinal samples comprise a plurality of Zone Improvement Plan ("ZIP") codes.

14. A first computing system comprising one or more processors and memory storing instructions that, in response to execution of the instructions by the one or more processors, cause the one or more processors to:
receive, by a bidder process executed by the one or more processors of the first computing system, a solicitation for bids to an auction process to populate an application slot with one or more digital components, wherein the auction process is executed by a second computing system that is in network communication with the first computing system;
in response to the determination that the auction process is soliciting bids, obtain, by the bidder process from the solicitation, a device identifier of an end user computing device at which the application slot is to be populated with one or more digital components;
retrieve, by the bidder process from memory of the first computing system, one or more bidding guidelines associated with the device identifier, wherein the one or more bidding guidelines are generated based at least in part on a geographic area that is estimated to contain a given percentile of a plurality of location ordinal samples accumulated over time by the end user computing device as it is carried among a plurality of geographic locations;
determine, by the bidder process, based on the retrieved bidding guidelines, a bid to populate the application slot with a particular digital component; and
provide, by the bidder process, the bid and a selected digital component to the auction process executed by the second computing system.

15. The first computing system of claim 14, wherein the one or more bidding guidelines associated with the device identifier are retrieved from volatile memory local to the first computing system.

16. The first computing system of claim 14, wherein the one or more bidding guidelines associated with the device identifier are generated based on statistical analysis of the plurality of accumulated location ordinal samples.

17. The first computing system of claim 16, wherein the statistical analysis includes estimating the geographic area that represents the given percentile of the plurality of accumulated location ordinal samples.

18. The first computing system of claim 17, wherein the geographic area is estimated based on a standard deviation calculated based on the plurality of accumulated location ordinal samples.

19. The first computing system of claim 14, wherein the plurality of accumulated location ordinal samples comprise a plurality of position coordinates.

20. The first computing system of claim 14, wherein the plurality of accumulated location ordinal samples comprise a plurality of Zone Improvement Plan ("ZIP") codes.

\* \* \* \* \*